United States Patent
Xu et al.

(10) Patent No.: US 7,372,662 B2
(45) Date of Patent: May 13, 2008

(54) BASE DECK WITH FORMED-IN-PLACE GASKETS AND IMPACT DISSIPATION MEMBERS FOR A DATA STORAGE DEVICE

(75) Inventors: Mo Xu, Singapore (SG); YiRen Hong, Singapore (SG); PohLye Lim, Singapore (SG); Niroot Jierapipatanakul, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 612 days.

(21) Appl. No.: 10/640,927

(22) Filed: Aug. 14, 2003

(65) Prior Publication Data
US 2005/0036233 A1  Feb. 17, 2005

(51) Int. Cl.
*G11B 33/08* (2006.01)
*G11B 33/14* (2006.01)
*G11B 17/028* (2006.01)
*G11B 21/08* (2006.01)
*G11B 25/04* (2006.01)

(52) U.S. Cl. .............................. 360/97.02; 360/99.08; 360/264.8

(58) Field of Classification Search ............. 360/97.01, 360/97.02, 97.03, 98.01, 98.07, 98.08, 99.08, 360/99.11, 99.12, 264.7, 264.8, 264.9, 265
See application file for complete search history.

(56) References Cited

U.S. PATENT DOCUMENTS

| | | | |
|---|---|---|---|
| 4,491,888 A * | 1/1985 | Brown et al. ............ | 360/97.03 |
| 4,950,521 A | 8/1990 | Takamura et al. | |
| 4,999,724 A * | 3/1991 | McAllister et al. ...... | 360/98.08 |
| 5,147,691 A | 9/1992 | Shimamoto et al. | |
| 5,291,355 A * | 3/1994 | Hatch et al. ............. | 360/97.01 |
| 5,326,611 A | 7/1994 | Kishita et al. | |
| 5,357,386 A * | 10/1994 | Haidari et al. ........... | 360/97.02 |
| 5,364,676 A | 11/1994 | Takago et al. | |
| 5,396,384 A * | 3/1995 | Caldeira et al. ......... | 360/98.01 |
| 5,422,766 A * | 6/1995 | Hack et al. ............... | 360/97.02 |
| 5,454,157 A * | 10/1995 | Ananth et al. ........... | 360/97.03 |
| 5,483,398 A * | 1/1996 | Boutaghou ............... | 360/97.02 |
| 5,535,092 A * | 7/1996 | Bang .......................... | 361/685 |
| 5,541,787 A * | 7/1996 | Jabbari et al. ........... | 360/97.01 |

(Continued)

FOREIGN PATENT DOCUMENTS

JP    05128753 A  *  5/1993

(Continued)

*Primary Examiner*—Craig A. Renner
(74) *Attorney, Agent, or Firm*—Westman, Champlin & Kelly

(57) ABSTRACT

A base deck is provided and includes a base plate having a plurality of parallel surfaces and a plurality of gasket retention grooves formed. A first gasket retention groove is formed in one of the plurality of parallel surfaces that is proximate a top cover. A second gasket retention groove is formed in one of the plurality of parallel surfaces and at least partially surrounds a motor mounting aperture. A third gasket retention groove is formed in one of the plurality of parallel surfaces and at least partially surrounds a connector mounting aperture. A first cured-in-place elastomer is formed on the base plate and is confined by the first gasket retention groove. A second cured-in-place elastomer is formed on the base plate and is confined by the second gasket retention groove. A third cured-in-place elastomer is formed on the base plate and is confined by the third gasket retention groove.

19 Claims, 3 Drawing Sheets

U.S. PATENT DOCUMENTS

| | | | |
|---|---|---|---|
| 5,546,250 A * | 8/1996 | Diel | 360/97.02 |
| 5,602,697 A * | 2/1997 | Jeong et al. | 360/97.02 |
| 5,646,801 A * | 7/1997 | Boigenzahn et al. | 360/97.01 |
| 5,677,813 A * | 10/1997 | Yoshida et al. | 360/97.02 |
| 5,703,734 A * | 12/1997 | Berberich et al. | 360/97.02 |
| 5,882,729 A | 3/1999 | Kahl et al. | |
| 6,168,459 B1 * | 1/2001 | Cox et al. | 360/97.01 |
| 6,329,014 B1 | 12/2001 | Kahl et al. | |
| 6,331,349 B1 | 12/2001 | Kalinoski et al. | |
| 6,501,615 B1 * | 12/2002 | Kelsic et al. | 360/97.02 |
| 6,510,021 B1 * | 1/2003 | Woldemar et al. | 360/97.01 |
| 6,583,968 B1 * | 6/2003 | Scura et al. | 360/97.02 |
| 6,934,126 B1 * | 8/2005 | Berding et al. | 360/97.01 |
| 2002/0047339 A1 * | 4/2002 | Bernett et al. | 310/51 |
| 2002/0093757 A1 * | 7/2002 | Daniel | 360/97.01 |
| 2003/0058572 A1 * | 3/2003 | Kant et al. | 360/97.01 |

FOREIGN PATENT DOCUMENTS

JP        10269747 A  * 10/1998

* cited by examiner

BASE DECK WITH FORMED-IN-PLACE GASKETS AND IMPACT DISSIPATION MEMBERS FOR A DATA STORAGE DEVICE

FIELD OF THE INVENTION

This invention relates generally to the field of magnetic data storage devices, and more particularly, but not by way of limitation, to a plurality of formed-in-place gaskets and impact dissipation members for a data storage device.

BACKGROUND

One key component of any computer system is a device, (such as a data storage device) to store data. The most basic parts of a data storage device are at least one information storage disc that is rotated, an actuator that moves a read/write head (head) to various locations over the substantially concentric data tracks of a disc, and electrical circuitry used for encoding data so that the data can be successfully retrieved and written to the disc surface. A microprocessor controls most of the operations of the disc drive including exchanging data between the computer system and the data storage device.

Among the challenges associated with data storage devices and data storage device assembly processes are cost effective techniques for sealing the heads and discs from external contaminants, and reducing the effects of externally encountered impacts. A reduction in component count or process step elimination frequently yields cost savings in excess of the component purchase price savings or the direct savings from the eliminated process step. Process step elimination prevents rework costs and handling damage encountered at that step. A reduced component count means fewer components need to be ordered, tracked, and controlled, thereby avoiding overhead costs associated with those components.

Prior techniques used in sealing the heads and discs from external contaminants included closed cell foam gaskets, die-cut from sheets of closed cell foam material with adhesive backings, which resulted in large amounts of wasted material, and the expenditure of material overhead costs for each product type flowing through the production process. Alternatively, the use of pre-molded gaskets in place of die-cut gaskets, which also requires expenditures of the type of overhead costs as that of the die-cut gaskets, have been, used in the production of data storage devices. Similarly, impact dissipation members provided on exterior portions of data storage devices are typically purchased components subject to the same overhead costs as the sealing gaskets.

Additionally, each individual component, added to the data storage device during the production process necessitates a step in the process, and each process step may be viewed as an opportunity to create re-work. For example, misalignment of a sealing gasket may lead to a pinched gasket section that fails to preclude migration of contaminants into the heads and discs from external environments, or adhesives used to secure the impact dissipation members may become exposed to contaminants, lose their adhesive characteristics, and promote disengagement of the impact dissipation members from the external surfaces of the data storage device.

As such, challenges remain and a need persists for cost effective techniques for sealing data storage devices, while also reducing the effects to the data storage device from externally encountered impacts. Techniques are needed that eliminate both component part count and production process steps, while improving consistency within the production process to provide data storage products with seals of high integrity and impact dissipation members securely positioned on exterior portions of data storage devices.

SUMMARY OF THE INVENTION

In accordance with preferred embodiments, a method, apparatus and combination are provided for sealing an internal environment of a head-disc assembly of a data storage device, dissipating vibrations encountered by a voice coil motor during operation of the data storage device, and inhibiting damage experienced by the head-disc assembly during the assembly process of the data storage device.

The combination includes a motor assembly rotating a disc into a data exchange relationship with a read/write head, the motor assembly supported by the base deck formed by steps for forming the base deck.

In one embodiment, the method preferably includes positioning a base plate within a gasket dispensing device, accelerating a gasket material dispensing head to preclude an initial accumulation of an oversupply of an uncured gasket material on the base plate, supplying the gasket material dispensing head with the uncured gasket material and dispensing the uncured gasket material on a top cover mounting surface of the base plate. The method preferably continues with discharging the uncured gasket material to a motor mount surface of the base plate and to a connector mounting surface to form an uncured motor mount gasket and an uncured connector gasket.

Preferentially, the method continues with applying the uncured gasket material within a base plate of a base deck for formation of a bottom pole damper within the base plate and dispensing uncured gasket material onto each external corner of the base plate to form impact dissipation members upon curing of the uncured formed-in-place gasket material. The base deck is formed upon curing the uncured formed-in-place gasket material applied to the base plate preferably at an elevated temperature in the range of 150° C. for a period of substantially 2 hours.

In another embodiment, an apparatus is preferably a base deck, which includes a base plate upon which preferentially a formed-in-place top cover gasket, a formed-in-place motor mount gasket, a formed-in-place connector gasket, a formed-in-place bottom pole damper and a plurality of formed-in-place impact dissipation members are secured to the base plate after the base plate undergoes an application and curing of formed-in-place gasket material.

These and various other features and advantages that characterize the claimed invention will be apparent upon reading the following detailed description and upon review of the associated drawings.

DETAILED DESCRIPTION

Figure 1:
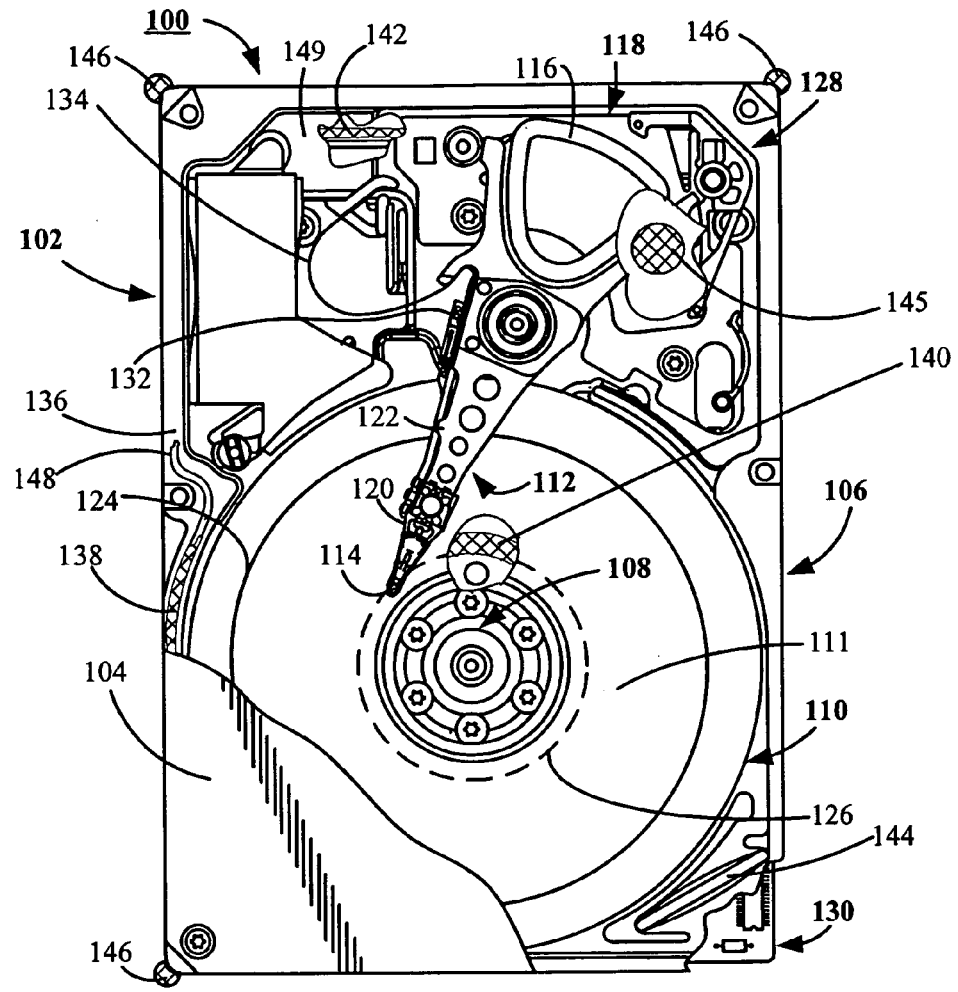
FIG. 1 is a partial cutaway top plan view of a data storage device (DSD) that incorporates a base deck with a plurality of formed-in-place gaskets, impact dissipation members and a bottom pole piece damper.

Referring now to the drawings, FIG. 1 provides a top plan view of a data storage device (DSD) 100. The DSD 100 includes a base deck 102 cooperating with a top cover 104 (shown in partial cutaway) to form a sealed housing for a mechanical portion of the DSD 100, referred to as a head-disc assembly (HDA) 106.

A spindle motor assembly (motor) 108 rotates a number of data storage discs 110 with a magnetic recording surface (surfaces) 111 at a substantially constant operational speed. An actuator assembly (actuator) 112 supports and rotates a number of read/write heads (heads) 114 into a data exchange relationship adjacent the magnetic recording surfaces 111 when current is applied to a coil 116 of a voice coil motor (VCM) 118. A head suspension 120 provides a predetermined spring force on the head 114 to maintain the proper data exchange relationship between the head 114 and the disc 110 during operation of the DSD 100. Additionally, the head suspension 120 serves to connect the head 114 with an actuator arm 122 of the actuator 112.

During operation of the DSD 100, the actuator 112 moves the heads 114 into the data exchange relationship with the disc 110, i.e., the actuator 112 moves the heads to data tracks 124 on the surfaces 111 to write data to and read data from the discs 110. When the DSD 100 is deactivated, the actuator 112 positions the heads 114 adjacent a home position 126 and the actuator 112 is confined by latching a toggle latch 128.

Command, control and interface electronics for the DSD 100 are provided on a printed circuit board assembly 130 mounted to the HDA 106. During data transfer operations, a preamplifier/driver (preamp) 132 attached to a flex circuit 134 conditions read/write signals conducted by the flex circuit 134 between the printed circuit board assembly 130 and the heads 114.

In a preferred embodiment, the base deck 102 includes a base plate 136 supporting a plurality of formed-in-place gaskets and internal filtration devices to maintain a substantially particulate free HDA 106 internal environment. Included among the plurality of formed-in-place gaskets supported by the base plate 136 (each shown in partial cutaway) are a formed-in-place top cover gasket 138, a formed-in-place motor mount gasket 140 and a formed-in-place connector gasket 142. Included among the internal filtration devices is a re-circulating filter 144.

Also shown in partial cutaway by FIG. 1, is a formed-in-place bottom pole damper (bottom pole damper) 145, which is used to dissipate vibrations encountered by the VCM 118 during operation of the DSD 100, and a plurality of formed-in-place impact dissipation members (impact dissipation members) 146. The formed-in-place impact dissipation members 146 inhibit damage experienced by the HDA 106 during handling of the HDA 106, during the assembly process of the DSD 100. By providing the formed-in-place bottom pole damper 145, alternate means of providing a bottom pole damper, such as using a "stick-on" polymer damper, can be averted, thereby eliminating a process step and the material purchase/management costs of a DSD 100 component.

One attribute of a preferred embodiment of the present invention is the use of a single material, applied at a single process step for the replacement of a plurality of components. That is the use of uncured formed-in-place gasket material (not shown separately), dispensed in the single process to provide the plurality of formed-in-place components (such as identified hereinabove). Because a single material and a single process step is used to replace a plurality of components, the overhead costs, direct costs, and rework costs associated with the plurality of individual components is substantially decreased or even eliminated. An additional attribute of a preferred embodiment of the present invention is an ability to confine application of the plurality of formed-in-place components within a single process step of assembling the DSD 100, thereby reducing the overall exposure to handling damage incurred during the assembly operation of the DSD 100.

In a preferred embodiment, each of the formed-in-place gasket components (i.e., top cover gasket 138, motor mount gasket 140 and connector gasket 142) are provided to preclude particle migration from an environment external to the HDA 106, to the environment and internal to the HDA 106. In other words, as will be discussed in greater detail during the discussion of FIG. 2, where a breach in the base plate 136 occurs (to facilitate mounting of components of the HDA 106 to the base plate 136) a gasket is provided to preclude the migration of particles into the internal environment of the HDA 106 from the external environment of the HDA 106.

As shown by the preferred embodiment of FIG. 1, a gasket retention groove 148 is formed in the base plate 136. The gasket retention groove 148 confines the formed-in-place top cover gasket 138 from lateral movement during the assembly process of the HDA 106, and facilitates control of a compression undergone by the formed-in-place top cover gasket 138 to produce a seal between the top cover 104 and the base deck 102, when the top cover 104 is secured to the base deck 102.

The seal produced by securing the top cover 104 to the base deck 102 mitigates transfer of particles from an environment external to the HDA 106 to the environment internal to the HDA 106, via a migration path between the top cover 104 and the base deck 102. Likewise, upon attachment of a flex circuit connector 149 to the base plate 136, the formed-in-place connector gasket 142 precludes transfer of particles from an environment external to the HDA 106 to the environment internal to the HDA 106, via a migration path between the flex circuit connector 149 and the base plate 136.

Additionally, utilization of a gasket retention groove, such as 148, improves the gripping power of the formed-in-place gasket material, because a greater surface area of contact between the base plate 136 and the formed-in-place gasket material is achieved, and a larger quantity of formed-in-place gasket material may be employed without jeopardizing space constraints of the DSD 100 while providing greater freedom in choosing a cross section size and stiffness of the resulting formed-in-place component.

In an alternate preferred embodiment, the gasket retention groove 148 is not present and the uncured gasket material is applied directly to the surface of the base plate 136. It will be noted, as covered in greater detail during the discussions of FIG. 3, FIG. 4 and FIG. 5, a gasket retention groove may be elected and provided, for any of the formed-in-place gaskets (top cover gasket 138, motor mount gasket 140 and connector gasket 142) utilized in producing the base deck 102.

Figure 2:
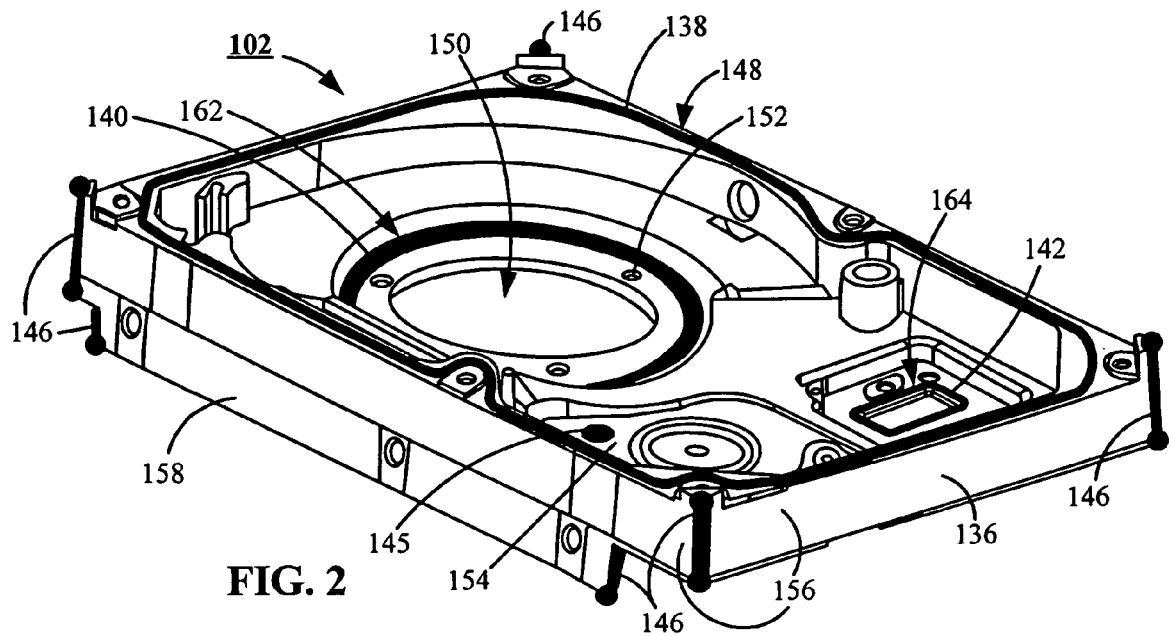
FIG. 2 is a top perspective view of the base deck of FIG. 1.

FIG. 2 shows a preferred embodiment of the base deck 102 (of FIG. 1) with the various components provided by the formed-in-place gasket material accentuated by the darkened surface presentations of those components for added clarity. That is, the formed-in-place top cover gasket 138, the formed-in-place motor mount gasket 140, the formed-in-place connector gasket 142, the impact dissipation members 146 and the formed-in-place bottom pole damper 145 are all illustrated as having darkened surface presentations.

FIG. 2 further shows the relationship between breaches in the base plate 136 used to facilitate mounting components of the HDA 106 (of FIG. 1) to the base plate 136. A motor mounting aperture 150 and a plurality of motor attachment apertures 152 are provided by the base plate 136 for attachment of the motor 108 (of FIG. 1). In a preferred embodiment, the formed-in-place motor mount gasket 140 is positioned such that each of the plurality of motor attachment apertures 152, in addition to the motor mounting aperture 150, are completely confined by the formed-in-place motor mount gasket 140.

During the assembly operation of the HDA 106 of a preferred embodiment, the motor 108 is secured to the base plate 136 by fastening means (not separately shown). The fastener means each impart a compressive load on the formed-in-place motor mount gasket 140 to provide a seal. The seal prevents particles from entering the internal environment of the HDA 106 from the motor mounting aperture 150 and the motor attachment aperture 152.

FIG. 2 also shows a bottom pole mounting surface 154 of the base plate 136 supporting the bottom pole damper 145. In addition FIG. 2 also shows, that impact dissipation members 146 are provided adjacent each of the plurality of corners of the base plate 136. That is, impact dissipation members 146 are provided for corners formed by pairs of adjacent walls 156, or by the proximal and distal ends of a data storage device (DSD) mounting member 158.

Figure 3:
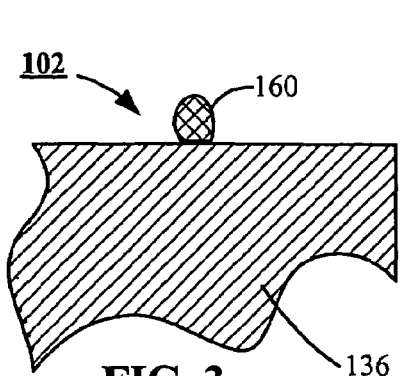
FIG. 3 is a partial cross-sectional elevational view of a formed-in-place gasket adjacent a base plate of the base deck of FIG. 2.

FIG. 3 shows a preferred embodiment of a cross-section of a bead of uncured formed-in-place gasket material (uncured gasket material) 160 adjacent a partial cutaway portion of the base plate 136, and absent the presence of a retention groove. It is noted that the relationship between the bead of uncured formed-in-place gasket material 160 and the base plate 136 remains consistent whether the portion of the base plate 136 is a portion adjacent the motor 108, the top cover 104, the flex circuit connector 149, one of the plurality of corners formed by adjacent walls 156, or the proximal or distal ends of the DSD mounting member 158, or the bottom pole mounting surface 154.

Figure 4:
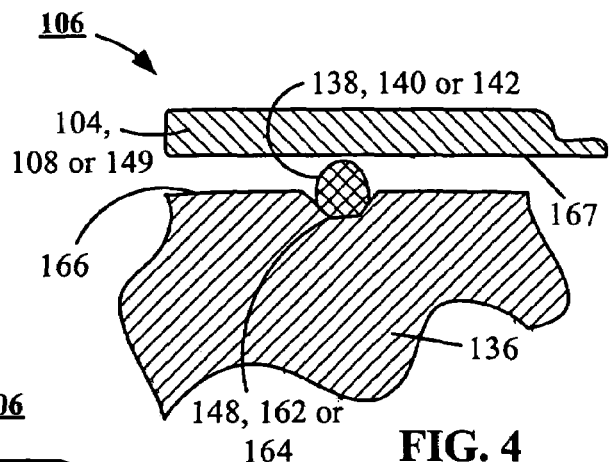
FIG. 4 is a partial cross-sectional elevational view of the formed-in-place gasket adjacent to and confined by a gasket retention groove of the base plate of the base deck of FIG. 2.
Figure 5:
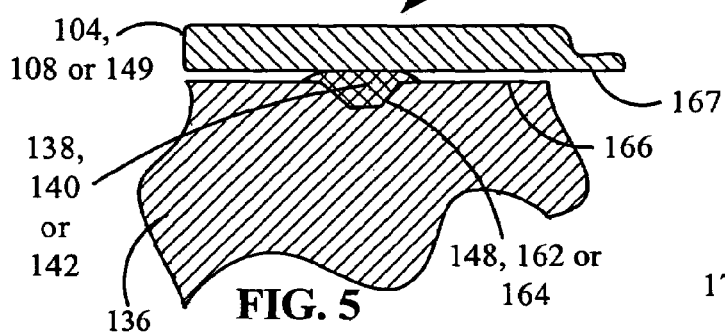
FIG. 5 is a partial cross-sectional elevational view of a formed-in-place gasket adjacent a deck plate of the base deck of FIG. 2, under compression by a component of the DSD of FIG. 1.

For discussion purposes and to heighten an understanding of the presently disclosed invention, but not by way of limiting the scope of the present invention, the term "formed-in-place gasket," as used in conjunction with discussions of FIG. 4 and FIG. 5, is understood to mean; the formed-in-place top cover gasket 138, the formed-in-place motor mount gasket 140, or the formed-in-place connector gasket 142 that results from a curing process of the uncured formed-in-place gasket material 160 (of FIG. 3).

The term "gasket retention groove," as used in conjunction with discussions of FIG. 4 and FIG. 5, is understood to mean; the gasket retention groove 148 adjacent the formed-in-place top cover gasket 138 (of FIG. 2), a second gasket retention groove 162 (of FIG. 2) adjacent the formed-in-place motor mount gasket 140, or a third gasket retention groove 164 (of FIG. 2) adjacent the formed-in-place connector gasket 142.

The term "adjacent component," as used in conjunction with discussions of FIG. 4 and FIG. 5, shall be understood to mean; the top cover 104 when referenced in conjunction with the formed-in-place top cover gasket 138, the motor 108 when referenced in conjunction with the formed-in-place motor mount gasket 140, or the flex circuit connector 149 when referenced in conjunction with the formed-in-place connector gasket 142.

While the term "base plate portion," as used in conjunction with discussions of FIG. 4 and FIG. 5, shall be understood to mean; a surface area of the base plate 136 adjacent the formed-in-place top cover gasket 138 when referenced in conjunction with the top cover 104 (of FIG. 1), a surface area of the base plate 136 adjacent the formed-in-place motor mount gasket 140 when referenced in conjunction with the motor 108 (of FIG. 1), or a surface area of the base plate 136 adjacent the formed-in-place connector gasket 142 when referenced in conjunction with the flex circuit connector 149 (of FIG. 1).

FIG. 4 shows a gasket retention groove 148, (which could alternately be gasket retention groove 162, or gasket retention groove 164) supporting the cured formed-in-place gasket 138 (which could alternately be formed-in-place gasket 140 for gasket retention groove 162, or formed-in-place gasket 142 for gasket retention groove 164). Provided by the base plate 136 and adjacent each of the retention grooves 148, 162, or 164 is an alignment surface 166. Likewise, each respective component adjacent each of the retention grooves 148, 162, or 164 (i.e., top cover 104 for gasket retention groove 148; motor 108 for gasket retention groove 162, or flex circuit connector 149 for gasket retention groove 162) provide a corresponding alignment region 167 that aligns with its corresponding alignment surface 166 during assembly of the HDA 106.

To avoid misalignment problems during assembly of the HDA 106, it has been found useful to provide each formed-in-place gasket 138, 140, or 142 supported by each retention groove 148, 162, or 164 of the base plate 136 with the alignment surface 166 near each respective formed-in-place gasket 138, 140, or 142. After installation and compression, each corresponding alignment region 167 of each respective adjacent component 104, 108, or 149 will be fully seated on their respective alignment surfaces of the base plate 136.

As illustrated by cured formed-in-place gasket 138, FIG. 5 shows the response of each cured formed-in-place gasket (138, 140 or 142) under the influence of their corresponding respective adjacent component 104, 108, or 149 during the assembly of the HDA 106 (illustrated in FIG. 5 by top cover 104). That is, as the respective adjacent components 104, 108, or 149 are secured to the base plate 136, each respective formed-in-place gaskets 138, 140, or 142 compresses to form a seal between the respective adjacent component 104, 108, or 149 and the respective base plate portions of the base plate 136 adjacent the respective retention grooves 148, 162, or 164 (as illustrated in FIG. 5 by retention groove 148).

Figure 6:
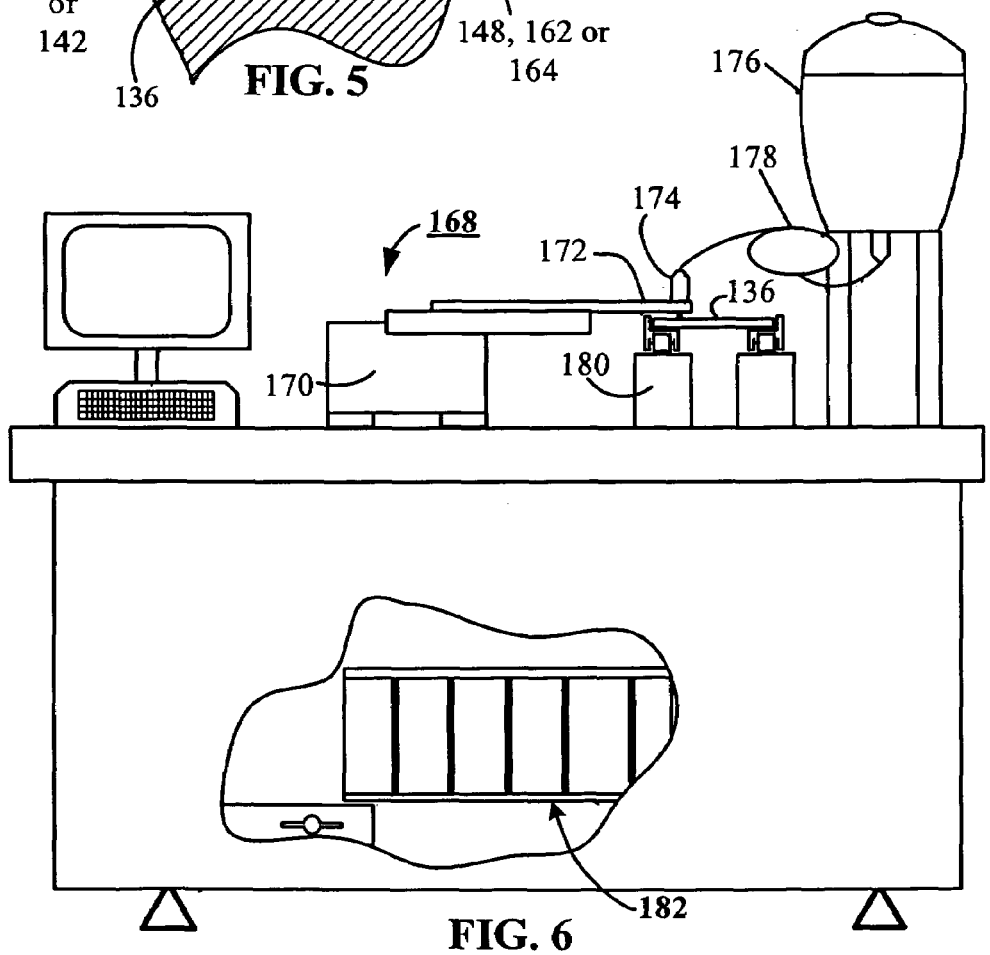
FIG. 6 is an elevational view of a formed-in-place gasket-dispensing device for dispensing the formed-in-place gaskets, impact dissipation members and the bottom pole damper of FIG. 2.

As recognized by those skilled in the art, the mechanical configurations of a formed-in-place gasket-dispensing device, such as a gasket-dispensing device 168 of FIG. 6, vary to accommodate a particular DSD and the manufacturing processes selected to produce that particular DSD. The mechanical presentation of the gasket-dispensing device 168 has been elected to add clarity and brevity in disclosing the subject matter of the invention. The elected structure is but one of multiple configurations in which numerous changes would readily suggest themselves to those skilled in the art, without changing the functionality of the gasket-dispensing device 168.

FIG. 6 shows a robotic positioning arm 170 with an end-effector 172 communicating with a gasket material dispensing head 174. The gasket material dispensing head 174 communicates with a gasket material reservoir 176 through a gasket material transport means 178, which transports the uncured gasket material 160 (of FIG. 3) to the base plate 136.

In a preferred embodiment, the formed-in-place gasket material is an epoxidized elastimer, such as 3M 7001 produced by the 3M Company of St. Paul, Minn., which cures or cross-links at elevated temperatures in the range of 150° C. for a period of substantially 2 hours. The uncured gasket material 160 is conveyed from the gasket material reservoir 176 through the uncured gasket material transport means 178 to the gasket material dispensing head 174 via the use of a worm gear type auger.

The use of a worm gear type auger to convey the uncured gasket material 160, as opposed to forcing the material through the transport means 178 using a piston or syringe or pneumatic means, provides two distinct advantages. First the material undergoes a complete mixing during the period of conveyance, and second, air within the material is brought to the surface and released, rather than being trapped within the material. Air trapped within the material can cause "blow holes" during cure cycles, or regions of reduced density within the bead of gasket material forming each formed-in-place gasket, impact dissipation members and bottom pole damper, which negatively effect the sealing capability of the formed-in-place gaskets 138, 140, 142 (of FIG. 2).

The base plate 136 of the base deck 102, (of FIG. 2) is transported and positioned beneath the dispensing head 174 by a conveyor assembly 180. The conveyer assembly 180, the transport means 178 and the robotic positioning arm 170 are individually and collectively controlled and monitored by control electronics 182. The control electronics 182 controls the metering or flow rate of the gasket material flowing through the dispensing head 174, in relation to the velocity of the robotic positioning arm 170, as the dispensing head 174 scribes the shapes of the subsequently cured formed-in-place gaskets 138, 140, 142, the bottom pole damper 145 (of FIG. 2) and the impact dissipation members 146 (of FIG. 2).

The feeds and speeds of the gasket-dispensing device 168 used for dispensing the uncured formed-in-place gasket material 160, are determined empirically and depend on the physical configuration of area the uncured formed-in-place gasket material 160 is to be applied, the material selected for the uncured formed-in-place gasket material 160, and the level of operational precision capabilities of the gasket-dispensing device 168. Speedline Technologies Camalot of Haverhill, Mass. designs and manufactures automated liquid dispensing systems of which their rotary auger material delivery technology, in combination with one of their Camalot line of products, such as the Camalot XYFLEX™ dispensing device, meets the demands of an embodiment of the present invention.

Figure 7:
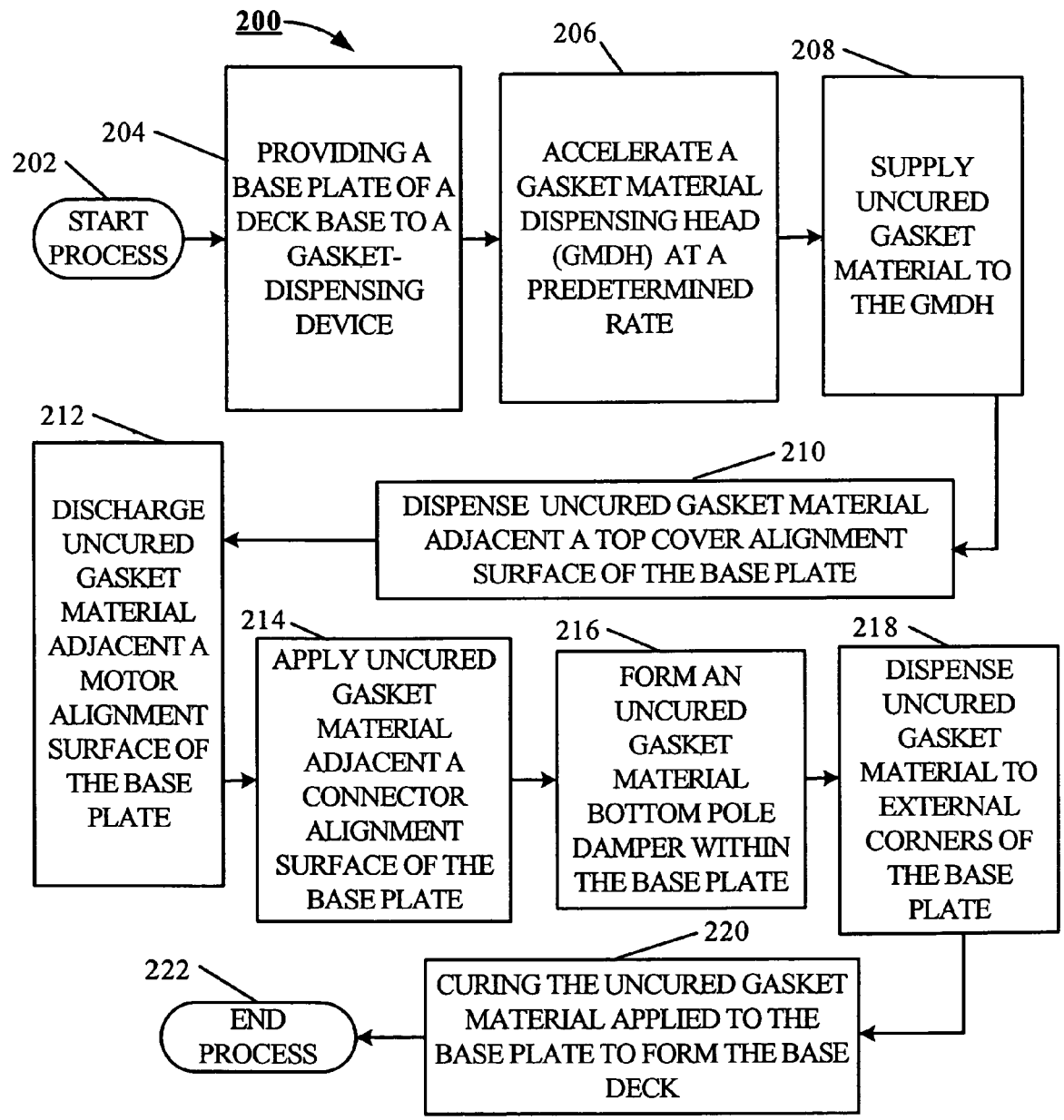
FIG. 7 is a flow diagram showing steps for applying the height variability control formed-in-place gasket to the top cover of FIG. 2.

FIG. 7 shows a preferred embodiment of a method of forming a base deck 200, commencing at start step 202 and continuing to process step 204, with providing a base plate (such as 136) of a base deck (such as 102) to a gasket-dispensing device (such as 168) for an application of an uncured gasket material (such as 160). At process step 206, a gasket material dispensing head (such as 174) is accelerated at a predetermined rate to assure consistent deployment of the uncured gasket material onto the base plate.

Preferably, at process step 208, the uncured gasket material is supplied to the gasket material dispensing head by a transport means (such as 178) delivering the uncured gasket material from a gasket material reservoir (such as 176). At process step 210, the uncured gasket material is preferentially dispensed adjacent an alignment surface (such as 166) and within a top cover gasket retention groove (such as 148), for subsequent curing to form a formed-in-place top cover gasket (such as 138). At process step 212, the uncured gasket material is preferentially discharged adjacent an alignment surface (such as 166) and within a gasket material retention groove (such as 162) for subsequent curing to form a formed-in-place motor mount gasket 140.

At process step 214, the uncured gasket material is preferentially applied adjacent an alignment surface (such as 166) and within a gasket material retention groove (such as 164) for subsequent curing to form a formed-in-place connector gasket (such as 142). At process step 216, the uncured gasket material is released by the gasket material dispensing head preferentially within the base plate for subsequent formation of a formed-in-place bottom pole damper (such as 145). While at process step 218, the uncured gasket material is preferably dispensed into matting contact with each of a plurality of corners for formation through a cure cycle of a plurality of formed-in-place impact dissipation members (such as 146). However, it is noted that the order sequence of process steps 212 through 218 as presented hereinabove is for disclosure purposes only, and does not impose any limitations on the present invention. The sequence in which process steps 212 through 218 may be preformed is discretionary.

At process step 220, the base plate with the applied uncured gasket material undergoes a curing process at a temperature of substantially 150° C. for a period of substantially 2 hours to form the formed-in-place components. The method of forming a base deck 200 concludes at process step 222.

Accordingly, in preferred embodiments, the present invention is directed to a base deck (such as 102), a method of forming the base deck (such as 200), and a data storage device (such as 100) that includes a motor assembly (such as 108) rotating a disc (such as 110), in which the disc is in a data exchange relationship with a read/write head (such as 114), and the motor assembly is supported by the base deck formed by steps for forming the base deck.

The base deck includes a base plate (such as 136) upon which a formed-in-place top cover gasket (such as 138), a formed-in-place motor mount gasket (such as 140), a formed-in-place connector gasket (such as 142), a formed-in-place bottom pole damper (such as 145) and a plurality of formed-in-place impact dissipation members (such as 146) are secured to the base plate after the base plate undergoes the base deck formation process.

It is to be understood that even though numerous characteristics and advantages of various embodiments of the present invention haven't been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the formed-in-place gasket while maintaining substantially the same functionality without departing from the scope and spirit of the present invention. In addition, although the preferred embodiment described herein is directed to a formed-in-place gasket for a data storage device, it will be appreciated by those skilled in the art that the teachings of the present invention can be applied to other systems without departing from the scope and spirit of the present invention.

What is claimed is:

1. A base deck comprising:
   a base plate having a plurality of parallel surfaces, wherein the base plate includes a motor mounting aperture and a connector mounting aperture formed in the base plate;
   a plurality of gasket retention grooves formed in the base plate, wherein a first gasket retention groove is formed in one of the plurality of parallel surfaces that is proximate a top cover when the top cover is engaged to the base plate, and wherein a second gasket retention groove is formed in one of the plurality of parallel surfaces and at least partially surrounds the motor mounting aperture, and wherein a third gasket retention groove is formed in one of the plurality of parallel surfaces and at least partially surrounds the connector mounting aperture;
   a first cured-in-place elastomer formed and cured on the base plate, the first cured-in-place elastomer being confined by the first gasket retention groove and configured to compressingly engage the top cover when the top cover is engaged to the base plate;
   a second cured-in-place elastomer formed and cured on the base plate, the second cured-in-place elastomer being confined by the second gasket retention groove; and
   a third cured-in-place elastomer formed and cured on the base plate, the third cured-in-place elastomer being confined by the third gasket retention groove.

2. The base deck of claim 1, wherein each of the plurality of gasket retention grooves includes a recessed surface that is recessed from an adjacent alignment surface, and wherein each of the plurality of gasket retention grooves includes at least two sidewalls adjacent the recessed surface and configured to confine a cured-in-place elastomer.

3. The base deck of claim 1, and further comprising at least one additional cured-in-place elastomer that forms a bottom pole damper, and at least one additional cured-in-place elastomer that forms an impact dissipation member.

4. The base deck of claim 3, further comprising an actuator mounting region formed in the base plate, wherein the bottom pole damper is positioned in the actuator mounting region.

5. The base deck of claim 1, and further comprising at least one additional cured-in-place elastomer, wherein the at least one additional cured-in-place elastomer includes an impact dissipation member.

6. The base deck of claim 5, wherein the base plate includes at least two walls joining to form at least one corner, wherein the impact dissipation member is positioned at and supported by at least one corner.

7. The base deck of claim 6, wherein the at least two walls are a plurality of wall pairs that join, to form a plurality of corners, and further wherein the at least one additional cured-in-place elastomer forms a plurality of impact dissipation members, wherein each of the plurality of impact dissipation members is positioned at and supported by one of the plurality of corners.

8. The base deck of claim 1, and further comprising:
   a fourth cured-in-place elastomer formed and cured on the base plate which forms a bottom pole damper; and
   a fifth cured-in-place elastomer formed and cured on the base plate, which forms an impact dissipation member.

9. The base deck of claim 8, further comprising an actuator mounting region formed in the base plate, wherein the bottom pole damper is positioned in the actuator mounting region.

10. The base deck of claim 9, wherein a data storage device mounting member of the base plate supports the impact dissipation member.

11. The base deck of claim 10, wherein the base plate comprises a plurality of walls that form a plurality of corners, and wherein the impact dissipation member is positioned at and supported by one of the plurality of corners.

12. The base deck of claim 1, and further comprising a fourth cured-in-place elastomer formed and cured on the base plate which forms an impact dissipation member, the impact dissipation member being positioned at and supported by one of a plurality of corners.

13. The base deck of claim 1, wherein the base plate comprises:
   a plurality of walls that form a plurality of corners; and
   a plurality of additional cured-in-place elastomers that form a plurality of impact dissipation members, each impact dissipation member being positioned at and supported by one of the plurality of corners.

14. The base deck of claim 1, further comprising a motor mounting surface, wherein the second cured-in-place elastomer is configured to engage and be compressed by a motor when the motor is mounted to the motor mounting surface.

15. The base deck of claim 14, further comprising a connector mount surface, wherein the third cured-in-place elastomer is configured to engage and be compressed by a connector when the connector is mounted to the connector mount surface.

16. A base deck comprising:
   a base plate having a plurality of walls forming a plurality of corners; and
   a plurality of cured-in-place elastomers formed and cured on the base plate, wherein a first cured-in-place elastomer is formed on a surface of the base plate and is configured to engage a top cover, and wherein a second cured-in-place elastomer is adjacent to and at least partially surrounds a motor mounting aperture formed in the base plate, and a third cured-in-place elastomer forms an impact dissipation member positioned at and supported by one of the plurality of corners.

17. The base deck of claim 16, wherein the third cured-in-place elastomer comprises a plurality of impact dissipation members, each of the impact dissipation members being positioned at and supported by one of the plurality of corners.

18. The base deck of claim 17, and further comprising a fourth cured-in-place elastomer that is adjacent to and at least partially surrounds a connector mounting aperture formed in the base plate.

19. The base deck of claim 18, wherein the first, second and fourth cured-in-place elastomers are confined by gasket retention grooves formed in parallel surfaces of the base plate.

* * * * *